United States Patent [19]

Denzler

[11] 3,923,829
[45] Dec. 2, 1975

[54] PREPARATION OF N-(1-ETHYL-α-PYRROLIDYLMETHYL)-2-METHOXY-5-SULFONAMIDOBENZAMIDE

[75] Inventor: Eric Alain Denzler, Zurich, Switzerland

[73] Assignee: Fratmann AG, Switzerland

[22] Filed: Nov. 19, 1974

[21] Appl. No.: 525,153

Related U.S. Application Data

[63] Continuation-in-part of Ser. No. 286,881, Sept. 7, 1972, abandoned.

[30] Foreign Application Priority Data

June 13, 1972 Switzerland.......................... 8813/72

[52] U.S. Cl............................. 260/326.47; 424/274
[51] Int. Cl.²......................................... C07D 207/14
[58] Field of Search................................ 260/326.47

[56] References Cited
UNITED STATES PATENTS
3,723,416   3/1973   Thominet...................... 260/239 BF Primary Examiner—Donald G. Daus
Assistant Examiner—D. B. Springer
Attorney, Agent, or Firm—Robert E. Burns; Emmanuel J. Lobato; Bruce L. Adams

[57] ABSTRACT

N-(1-ethyl-α-pyrrolidylmethyl)-2-methoxy-5-sulfonamidobenzamide is prepared by reacting N-ethyl-α-aminomethyl-pyrrolidine with phosphorus oxychloride to give N,N',N''-(1-ethyl-α-pyrrolidylmethyl)-phosphoramide which is then reacted with 2-methoxy-5-sulfonamidobenzoic acid.

2 Claims, No Drawings

PREPARATION OF N-(1-ETHYL-α-PYRROLIDYLMETHYL)-2-METHOXY-5-SULFONAMIDOBENZAMIDE

RELATED APPLICATIONS

This application is a CIP of Serial No. 286,881 filed 7 September 1972 and now abandoned.

FIELD OF THE INVENTION

The invention relates to the preparation of N-(1-ethyl-α-pyrrolidylmethyl)-2-methoxy-5-sulfonamidobenzamide, a product used for treating gastro-intestinal diseases and also used in the field of psychiatry.

THE INVENTION

According to the invention, a process is provided for preparing N-(1-ethyl-α-aminomethyl-pyrrolidine with phosphorus oxychloride to give N, N', N''-(1-ethyl-α-pyrrolidylmethyl)-phosphoramide in the form of its hydrochloride and reacting the N,N',N''-(1-ethyl-α-pyrrolidyl-methyl)-phosphoramide and its hydrochlorides with 2-methoxy-5-sulfonamidobenzoic acid, to form the N-(1-ethyl-α-pyrrolidylmethyl)-2-methoxy-5-sulfonamidobenzamide.

The first reaction with phosphorus oxychloride may be carried out with either pyridine, or dioxane as the preferred solvent and reaction medium.

By carrying out the reaction of N-ethyl-α-aminomethyl-pyrrolidine with phosphorus oxychloride in dioxane, the N,N', N''-(1-ethyl-α-pyrrolidyl methyl)-phosphoramide may be isolated in the form of a mixture of di- and tri-hydrochloride.

By using pyridine, a proton acceptor, as the solvent, the intermediate N,N', N''-(1-ethyl-α-pyrrolidylmethyl-phosphoramide remains in solution and the second reaction may be initiated in the solution. Other equivalent inert alkyl-substituted pyridines such as βpicoline (bp 143) may be used.

The temperature of the initial reaction is not critical as it is initiated easily at or below room temperature and is readily completed.

The second reaction with 2-methoxy-5-sulfonamidobenzoic acid requires heating. For convenience it is preferred to conduct this reaction at elevated temperatures up to about the reflux temperature of the solvent but generally temperatures in the range of about 75°–150°C. are satisfactory. Pyridine the preferred solvent boils at 115°–116°C. (760 Torr). The reaction rate may be increased by utilizing pressure vessels to operate at the higher than reflux temperature but the time thus saved is minimal.

DETAILED DESCRIPTION

The process according to the invention proceeds according to the following reaction diagrams:

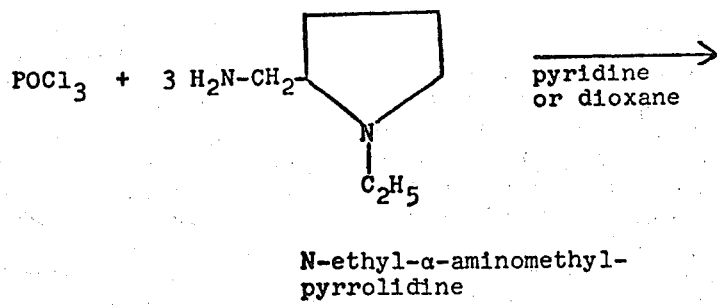

N-ethyl-α-aminomethyl-pyrrolidine

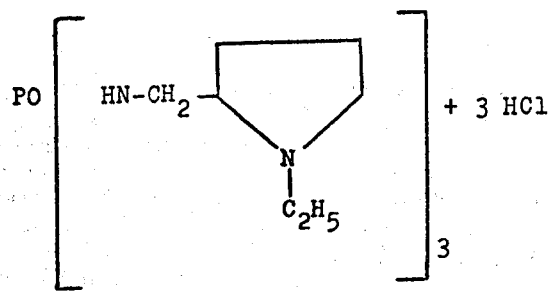

N,N',N''-(1-ethyl-α-pyrrolidylmethyl)-phosphoramide

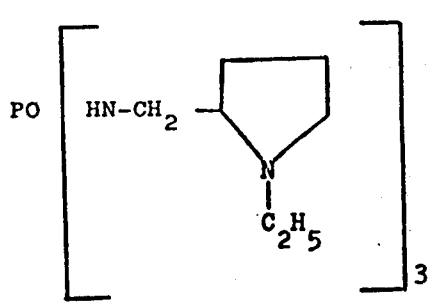 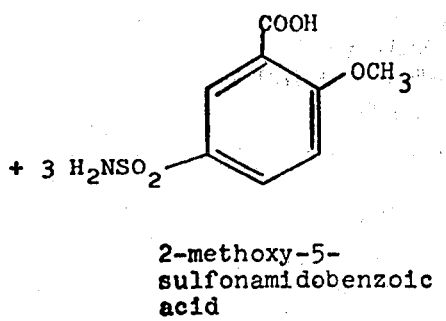

2-methoxy-5-sulfonamidobenzoic acid

N,N',N" - (1-ethyl-α-pyrrolidylmethyl)-phosphoramide $\longrightarrow$
pyridine

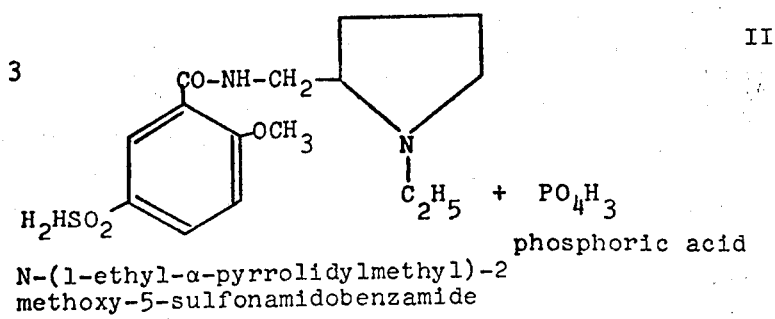

phosphoric acid

N-(1-ethyl-α-pyrrolidylmethyl)-2 methoxy-5-sulfonamidobenzamide

EXAMPLE 1 a. 27 g. (0.21 mol.) of N-ethyl-α-amino-methyl-pyrrolidine and 560 ml. of pyridine are introduced into a 1 litre reaction flask provided with an agitator, a thermometer, a cooler and a dropping funnel. To this solution a 6.1 g. (0.04 mol.) solution of phosphorus oxychloride in 65 ml. of pyridine is fed dropwise with the temperature maintained at 20°C.

b. After stirring for half an hour, 14.8 g. (0.064 mol.) of 2-methoxy-5-sulfonamidobenzoic acid are added and reflux heated during four and a half hours.

c. The reaction mixture obtained is then concentrated in vacuo to half its volume, filtered, and the filtrate is evaporated to dryness. The residue is dissolved in 200 ml. of water and 40 ml. of hydrochloric acid to a pH of 1.

The filtered solution is left in a refrigerator overnight, then filtered and the precipitate is dried in an oven at 50°C.

d. The precipitate is dissolved in warm water. A lighter insoluble residue is filtered during boiling and the hot solution is alkalized with ammonia.

e. This solution is allowed to cool, filtered, washed with water and the precipitate is dried in an oven at 50°C. In this manner, 7.5 g. of N-(1-ethyl-α-pyrrolidyl-methyl)-2-methoxy-5-sulfonamidobenzamide, with a melting point of 179°C., are obtained.

Analysis of the nitrogen content, determined by using perchloric acid (100%), showed 12.24% by weight of nitrogen compared to the calculated value of 12.32%.

EXAMPLE 2 a. 27 g. (0.21 mol.) of N-ethyl-α-aminomethyl pyrrolidine and 500 ml. of dioxane are introduced into a one litre reaction flask provided with a thermometer, a cooler and a dropping funnel. To this solution a solution of 6.1 gm. (0.04 mol.) solution of phosphorus oxychloride in 75 ml. of dioxane is fed directly with the reaction mixture cooled to maintain the temperature at about 20°C. ± 10°. Upon completion of the reaction the precipitated hygroscopic di- and tri- hydrochloride salts of N, N', N", -(1-ethyl-α-pyrrolidylmethyl-pyrrolidine are filtered and washed with dry dioxane. This product may be recrystallized and further purified before dissolving in 400 ml. of pyridine and proceeding as in Example 1 b–e. Alternatively after washing it may be directly dissolved in the pyridine and the second stage reaction initiated as in Example 1 b–e.

It must be noted that the above description and examples are merely directed to the preferred mode of carrying out this invention.

All art-recognized equivalent materials and reaction conditions are intended within the scope of this disclosure.

I claim:

1. A process for preparing N-(1-ethyl-α-pyrrolidyl-methyl)-2-methoxy-5-sulfonamidobenzamide, comprising the steps of mixing N-ethyl-α-aminomethyl-pyrrolidine with phosphorus oxychloride in a solvent selected from pyridine and dioxane to form N,N',N"-(1-ethyl-α-pyrrolidylmethyl)-phosphoramide, removing the dioxane, if present, and then heating at 75° to 150°C. the N,N',N"-(1-ethyl-α-pyrrolidyl-methyl)-phosphoramide with 2-methoxy-5-sulfonamidobenzoic acid in pyridine in the presence or absence of autogenous pressure.

2. A process according to claim 1, in which the reaction of N-ethyl-α-aminomethyl-pyrrolidine with phosphorus oxychloride is carried out in dioxane and the N,N',N"-(1-ethyl-α-pyrrolidylmethyl)-phosphoramide is isolated in the form of a mixture of di- and tri- hydrochlorides.

* * * * *